(12) United States Patent
Shakeri et al.

(10) Patent No.: US 7,949,502 B2
(45) Date of Patent: May 24, 2011

(54) PROCESSING COMPOSITE DATA SIGNAL BY EXPANSION IN A GRAPHICAL REPRESENTATION

(75) Inventors: Mojdeh Shakeri, Southborough, MA (US); Krishna Balasubramanian, West Roxbury, MA (US)

(73) Assignee: The MathWorks, Inc., Natick, MA (US)

( * ) Notice: Subject to any disclaimer, the term of this patent is extended or adjusted under 35 U.S.C. 154(b) by 643 days.

(21) Appl. No.: 12/069,212

(22) Filed: Feb. 8, 2008

(65) Prior Publication Data

US 2008/0316219 A1   Dec. 25, 2008

Related U.S. Application Data

(60) Provisional application No. 60/936,771, filed on Jun. 22, 2007.

(51) Int. Cl.
G06F 7/48 (2006.01)
(52) U.S. Cl. .......................................................... 703/6
(58) Field of Classification Search ................... 703/6
See application file for complete search history.

(56) References Cited

U.S. PATENT DOCUMENTS 7,487,076 B2 * 2/2009 Szpak et al. .................... 703/14
7,742,903 B2 * 6/2010 Ciolfi et al. ...................... 703/6
2002/0183998 A1  12/2002 Shakeri et al.
2005/0107998 A1   5/2005 McLernon et al.
2007/0157162 A1 * 7/2007 Ciolfi ............................. 717/105

FOREIGN PATENT DOCUMENTS

WO  WO-2005/043422 A1  5/2005

OTHER PUBLICATIONS

International Preliminary Report on Patentability for Application No. PCT/US2008/007746, dated Sep. 10, 2009.
Karris, Steven T., "Introduction to Simulink® with Engineering Applications," Orchard Publications, (2006).
The MathWorks, "Simulink® Model-Based and System-Based Design," Using Simulink, Version 4, (2001).
International Search Report for Application No. PCT/US2008/007746, dated Nov. 5, 2008.

* cited by examiner

*Primary Examiner* — Jason Proctor
*Assistant Examiner* — Eunhee Kim
(74) *Attorney, Agent, or Firm* — Nelson Mullins Riley & Scarborough LLP; Kevin J. Canning; Neslihan I. Doran

(57) ABSTRACT

A computer system for processing composite data is provided. The system includes means for processing a computing operation that is designed to receive a non-composite data type as at least one input. The composite data is provided to the computing operation as the at least one input. The system further includes an expansion marker that indicates each element in a first composite data needs to be processed separately and an expansion mechanism that uses the computing operation to process each element in the first composite data individually. The system also includes storage for storing a result of processing each element of the first composite data individually with the computing operation.

25 Claims, 11 Drawing Sheets

$$y = fcn(@u)$$

$$y.a = fcn(u.a)$$
$$y.b = fcn(u.b)$$

PROCESSING COMPOSITE DATA SIGNAL BY EXPANSION IN A GRAPHICAL REPRESENTATION

RELATED APPLICATION

The instant application claims the benefit of provisional patent application No. 60/936,771 filed Jun. 22, 2007, the contents of which are incorporated herein by reference in their entirety.

BACKGROUND

In programs and models, it sometimes is desirable to operate on "composite data." Composite data, as used herein, refers to data that includes more than one data element. The data elements of a composite data are not required to be organized in a given manner. The data elements of a composite data may be of different data types or different dimensions. For example, a composite data may include any combination of a scalar data, a vector data, a matrix data, an array of data, etc. One example of composite data is a composite signal. A composite signal is a signal that contains other signals.

In some graphical programs and models, special blocks may be used to process composite data because other types of blocks, such as blocks for non-composite data, may not be capable of processing composite data.

In some textual programs and models, special functions may be used to operate on composite data because conventional functions that are designed for non-composite data do not work properly on composite data.

Some programming languages may have templates used in conjunction with classes that are constructed to operate on multiple data types and data classes. The data classes may include an array of objects of different class types. However, these data classes may need to share a base class or a similar mechanism to provide a way to process the multiple data types and data classes. Unlike these templates, the elements of a composite data are not required to share a base class or a similar mechanism.

SUMMARY

In one embodiment, a computer-implemented method for processing composite data is provided. The method may include identifying a computing operation that is designed to receive a non-composite data type as at least one input. The composite data is provided to the computing operation as the at least one input. A marker may indicate that each element in the composite data needs to be processed individually. The marker may be identified. The computing operation may be used to process each element in the composite data individually to produce a processed result. The processed result is stored. A computer-readable medium may hold computer-executable instructions that when executed by a computing device cause the computing device to perform this method.

In another embodiment, a computer-implemented method for processing a composite signal in a graphical environment is provided. The method includes identifying a first graphical component that operates on at least one input of a non-composite data type in a graphical representation. A first composite signal including a plurality of non-composite signals is provided to the first graphical component as the at least one input. The first composite signal is expanded to the plurality of non-composite signals at a first location. Each of the plurality of non-composite signals is processed individually using the first graphical component or a replica of the first graphical component. The graphical representation is displayed having each of the plurality of non-composite signals processed individually. A computer-readable medium may hold computer-executable instructions that when executed by a computing device cause the computing device to perform this method.

In yet another embodiment, a computer-implemented method for processing composite data with a function is provided. The method includes invoking a function defining a processing instruction operating on at least one input argument of a non-composite data type. A first composite data including a plurality of non-composite data is provided to the function as the at least one input argument. The function is invoked to operate on each of the plurality of non-composite data in the first composite data. A second composite data is outputted including results of the function operating on each of the plurality of non-composite data in the first composite data. The second composite data is stored. A computer-readable medium may hold computer-executable instructions that when executed by a computing device cause the computing device to perform this method.

In still another embodiment, a computer system for processing composite data is provided. The system includes a processor for processing a computing operation that is designed to receive a non-composite data type as at least one input. The composite data is provided to the computing operation as the at least one input. The system further includes an expansion marker that indicates each element in a first composite data needs to be processed separately and an expansion mechanism that uses the computing operation to process each element in the first composite data individually. The system also includes a storage for storing a result of processing each element of the first composite data individually with the computing operation.

BRIEF DESCRIPTION OF THE FIGURES

The foregoing and other aspects, features, and advantages of the invention will become more apparent and may be better understood by referring to the following description taken in conjunction with the accompanying drawings, in which.

DETAILED DESCRIPTION

Exemplary embodiments described herein may use an expansion marker and/or a collapse marker when processing composite data. The expansion marker may indicate that composite data is to be expanded so that each element in the composite data can be individually processed using a computing operation. A plurality of techniques may be used to accomplish the task performed by the expansion marker. A text port and/or a textual marker in the graphical model are examples of acceptable techniques. In contrast, a collapse marker may indicate that individual data elements are collapsed into a single composite data. Expanded composite data can be processed by a computing operation that operates on individual data elements rather than on composite data. Elements of the composite data are processed concurrently. This is different than processing the elements of, e.g. an array data, in a loop structure where only one element is processed at a given time. The use of expansion markers may allow a single type of computation operation to be used. In contrast, programs or models that do not use expansion markers may require the use of computation operations for both composite data and individual elements.

Exemplary embodiments may include composite data that can include data elements where each data element in the composite data may vary as to data type and dimension. Composite data may include other composite data, etc. Individual data elements in the composite data can be arranged hierarchically in the composite data, or can have no hierarchy among the data elements. Exemplary embodiments may further include composite data that can be nested, where "nested" refers to composite data that includes or contains other composite data.

Exemplary embodiments may operate with textual programs, textual models, graphical programs, and/or graphical models. In textual programs or models, a character or characters may serve as an expansion marker or as a collapse marker. In graphical programs or models, expansion and/or collapse markers may be represented graphically, textually, or both graphically and textually.

Figure 1A:
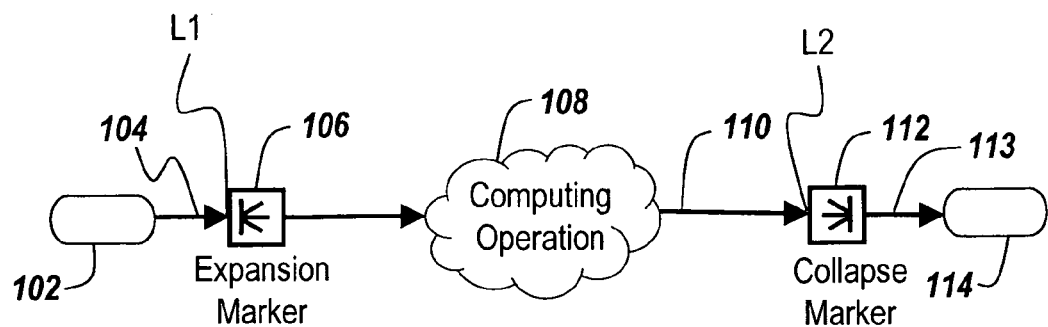
FIG. 1A illustrates an expansion marker and a collapse marker that can be used with a composite signal in an exemplary graphical environment.

FIGS. 1A-1C and FIGS. 2A-2B illustrate two examples of the use of expansion markers and collapse markers. FIG. 1A illustrates an exemplary expansion marker and an exemplary collapse marker that can be used with a composite signal in graphical representation 100 (such as a graphical model or a graphical program).

Graphical representation 100 may include source 102, composite signal 104, expansion marker 106, computing operation 108, expanded signal 110, collapse marker 112, composite signal 113 and output 114.

Source 102 may include a mechanism for generating data, e.g., composite data, one or more data elements, etc. In one embodiment, source 102 may be represented using an icon. Data generated by source 102 may include values, such as numerical values, that represent a continuous signal or discrete signal. Composite signal 104 may be output from source 102 and may include two or more signals.

Expansion marker 106 may be a block that accepts a composite signal 104 at an input and produces a number of individual data elements at an output. In one embodiment, the individual data elements may include a number of signals. Expansion marker 106 may expand composite signal 104 into individual data elements making up composite signal 104.

Computing operation 108 may include a mechanism for operating on incoming data to produce an output or result. In one embodiment, computing operation 108 can be performed by one or more graphical modeling components that can be represented as blocks, subsystems, or a state in an executable graphical model. Computing operation 108 may operate on the individual data elements to produce a number of results. For example, computing operation 108 may produce a number of results 110 that equals a number of individual data elements received by computing operation 108. Results 110 may be provided to collapse marker 112 to form a composite signal 113 that is fed to output 114.

Collapse marker 112 may include a mechanism for receiving a number of data elements in the expanded signal 110 at an input and producing one or more composite signals at an output. Output 114 may include a mechanism for receiving composite signals or non-composite signals. In one embodiment, output 114 may store signals, and in another embodiment, output 114 may make received signals available to a destination, e.g., a display device.

Figure 1B:
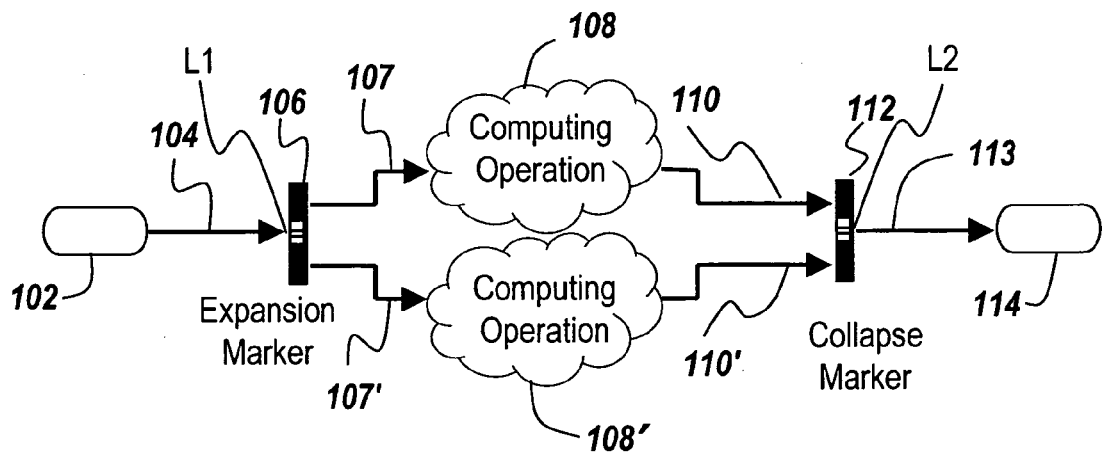
FIG. 1B illustrates how the composite signal in FIG. 1A is processed according to an exemplary embodiment.

FIG. 1B illustrates an alternative graphical representation from FIG. 1A that includes a composite signal that is made up of two individual data elements 107 and 107'. In one embodiment, an interpreter or a compiler may operate on graphical representation 100 (FIG. 1A), and the graphical representation 100' of FIG. 1B may be a representation of the graphical representation 100 during the compilation process. For example, graphical representation 100' (FIG. 1B) may split composite signal 104 into a first element 107 and a second element 107' using expansion marker 106. First element 107 may be fed to computing operation 108 and second element 107' may be fed to computing operation 108'. In one embodiment, computing operation 108' may be a second instantiation of computing operation 108, and in another embodiment, computing operation 108' may be an operation that is unique with respect to computing operation 108. For example, computing operation 108 may represent a first processing thread and computing operation 108' may represent a second processing thread, where the second processing thread differs from the first processing thread.

The second processing thread may also be a different instance of the first processing thread. Alternatively, the second processing thread may be dispatched as a thread that performs the semantically equivalent computing operation 108' on second element 107'.

Computing operation 108 may produce result 110 and computing operation 108' may produce result 110'. For example, result 110 may be a first processed data element and result 110' may be a second processed data element. Collapse marker 112 may produce composite signal 113 that includes result 110 and result 110'. Collapse marker 112 may send composite signal 113 to output 114 for storage or transmission to another device, software object, application, etc.

Figure 1C:
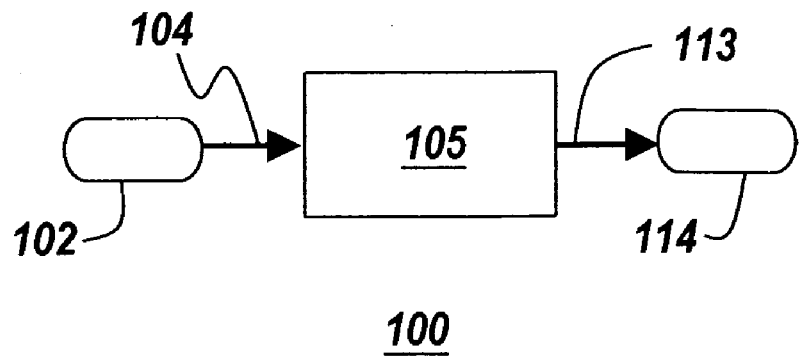
FIG. 1C illustrates an exemplary subsystem that may be used to provide the expansion marker and the collapse marker in FIG. 1A.

FIG. 1C illustrates an exemplary embodiment of graphical representation 100 that uses a subsystem block 105 to represent groups of components. For example, subsystem block 105 may include expansion marker 106, computing operation 108, results 110, and collapse marker 112. The use of subsystem blocks presents the elements of the graphical representation in hierarchical groupings to help a user interact with the graphical representation. In the embodiment of FIG. 1C, a user may select subsystem block 105 (e.g., by double clicking on the block using a mouse) to open subsystem block 105 so that components making up subsystem block 105 can be viewed or edited.

Subsystem block 105 may accept composite signal 104 as an input and may output composite signal 113 to output 114. In another embodiment, subsystem block 105 may accept a composite signal and may output two or more individual data elements.

Exemplary embodiments may employ computing operations as distinct mechanisms (e.g., a cloud as used in FIG. 1A or 1B) or computing operations may be embodied in other mechanisms or devices (e.g., a computing operation may be embodied in a block or other type of graphical/textual representation).

Figure 2A:
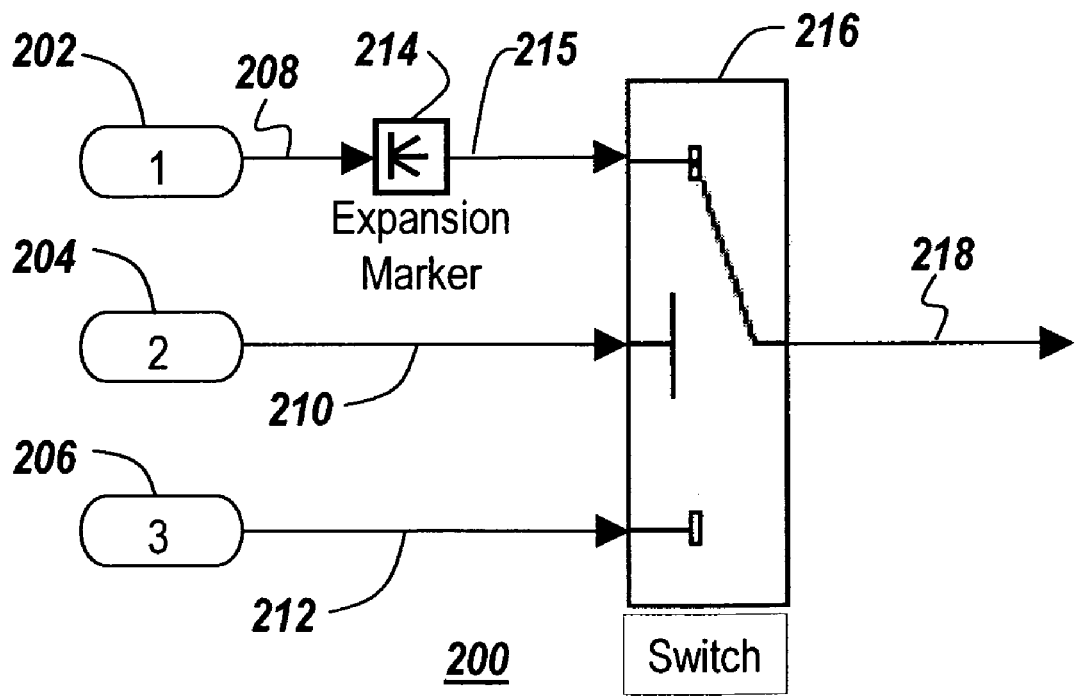
FIG. 2A illustrates an expansion marker that may be used with a process that accepts input signals in an exemplary graphical environment.
Figure 2B:
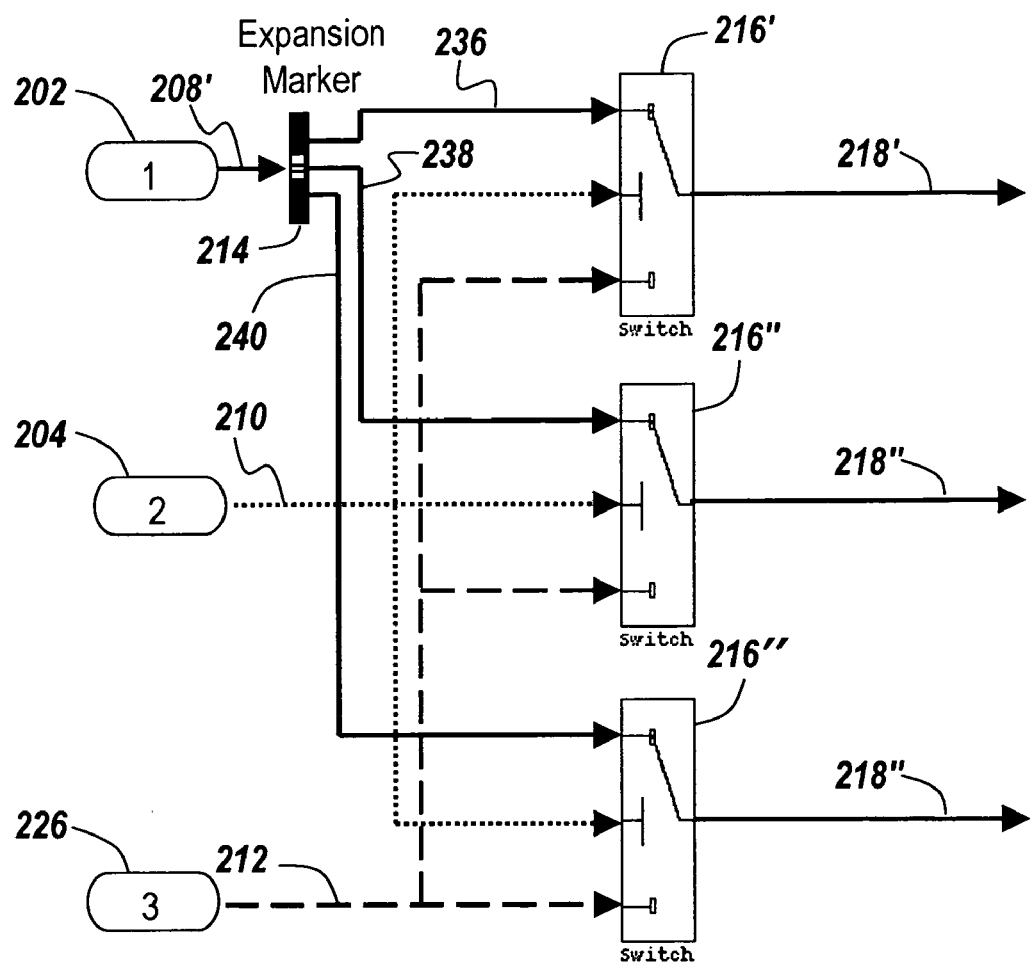
FIG. 2B illustrates how the process in FIG. 2A may be used to handle a composite signal using an expansion marker.

FIGS. 2A and 2B illustrate graphical representations that demonstrate alternative uses of the expansion markers.

FIG. 2A shows a graphical representation 200 that includes sources 202, 204, and 206. Source 202 produces composite signal 208 that includes three non-composite signals. In contrast, sources 204 and 206 provide respective non-composite signals 210 and 212. Composite signal 208 is passed to the expansion marker 214, where the composite signal 208 is expanded into its non-composite signals, referred in aggregate as expanded signal 215. Switch 216 receives the expanded signal 215 and the non-composite signals 210 and 212. Switch 216 selects among these input signals 212 and 215 based on control signal 210 that indicates to switch 216 which signal to choose. Switch 216 passes the selected signal as output 218. For the example shown in FIG. 2A, switch 216 selects one or more of the non-composite signals (designated as expanded signal 215) that make up composite signal 208 to be output 218.

FIG. 2B illustrates the operation of the graphical representation of FIG. 2A in greater detail. Referring now to FIG. 2B, expansion marker 214 splits the incoming composite signal 208 into three non-composite signals 236, 238 and 240, respectively. A computing operation in switch block 216 (FIG. 2A) may be able to operate on the non-composite signals individually or collectively since switch block 216 may be provided with non-composite signals 236, 238, and 240. For purposes of representation, switch block 216 and/or computing operations therein may be represented as three switch blocks 216', 216", and 216''', where the switch blocks each receive all three non-composite signals. Computing operations 216', 216", and 216''' may each produce an output signal 218', 218" or 218''', respectively, where output signals 218', 218" and 218''' are non-composite signals. Computing operation of switch block 216' may have polymorph operations 216" and 216''' (i.e. switch blocks 216" and 216'''). The polymorph operations may execute different codes based on the properties of the non-composite signals 236, 238, and 240, such as datatype (e.g. fixed-point or double) or domain (e.g. data domain or time domain). Computing operations 216" and 216''' (i.e. switch blocks 216" and 216''') may also be a duplicate of computing operation of switch block 216'. Computing operations 216" and 216''' still receive non-composite signals 210 and 212 as inputs.

Figure 3A:
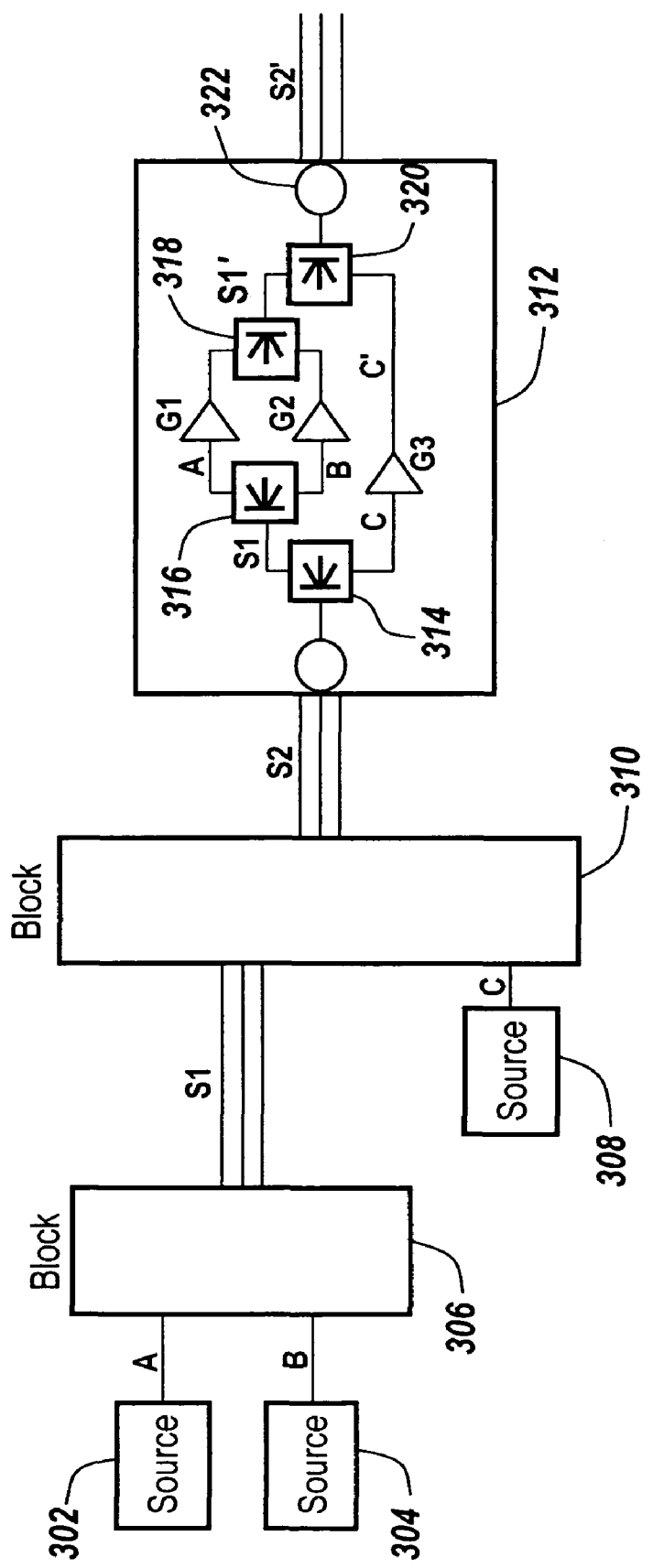
FIG. 3A illustrates an exemplary graphical representation that illustrates the ability to customize the degree of expansion of composite signals.

FIG. 3A illustrates an exemplary embodiment that allows composite signals to be expanded to a low level of detail (e.g., an individual signal) or allows low level signals or other information to be consolidated into composite signals. For example, the exemplary embodiment of FIG. 3A, as well as other embodiments described herein, may allow information (e.g., signals) to be expressed at various levels of detail. For example, a composite signal may be expanded to a first level of detail or a second level of detail where the first level of detail is higher than the second level of detail.

Referring to FIG. 3A, signals A and B may be fed from sources 302 and 304 to block 306 to produce composite signal S1. Block 310 may receive signal C from source 308 and signal S1 to produce composite signal S2. The composite signal S2 is passed to a subsystem 312. A user may wish to apply gain to signals A, B and/or C. The subsystem 310 allows composite signal S2 to be expanded to a determined level of detail so that the gains (e.g., gains G1, G2 and G3) can be applied to signals A, B and C, respectively. Upon expansion, no operation may be applied to one or more of the expanded signals A, B or C. This process is referred as the no-op operation. The no-op operation "does nothing" and can be used where there is no operation to perform on one or more of the expanded signals A, B or C. Alternatively, the data conveyed by expanded signals A, B or C may be processed. The processing may occur in the same memory location. This process is referred as the in-place operation. According to another option, the processing of data conveyed by expanded signals A, B or C may occur in a separate memory location. In the embodiment of FIG. 3A, the user may wish to apply the gains at a low level of detail, e.g., at the individual signal level, as shown in the block that includes gain elements G1, G2 and G3.

In particular, expansion marker 314 expands composite signal S2 into composite signal S1 and non-composite signal C. Composite signal S1 is then expanded by expansion marker 316 to non-composite signals A and B. Signal A is input to gain G1, and signal B is input to gain G2. The outputs of gains G1 and G2 are collapsed into a composite signal S1' as indicated by collapse marker 318. The signal C passes through gain G3 to produce signal C'. Signals S1' and C' are collapsed as indicated by collapse marker 320 to produce composite signal S1'. Composite signal S2' is output from the subsystem 312. Exemplary embodiments allow expansion operations to be performed on signals, parameters, etc.

In another embodiment, not shown in FIG. 3A, the user may wish to apply the gains at a higher level (e.g., a level that is higher than the level shown in FIG. 3A). Exemplary embodiments may allow levels to be determined by a user and/or by a device, such as computing device 502). In addition, the levels can be determined locally with respect to computing device 502 or remotely (e.g., computing device 502 may receive level information or selections from a server). When a level is specified by a user or device, an embodiment may allow composite signals to be expanded to the specified level. The exemplary embodiments may employ blocks or other graphical representations that can identify whether they are interacting with a composite signal or a non-composite signal.

Figure 3B:
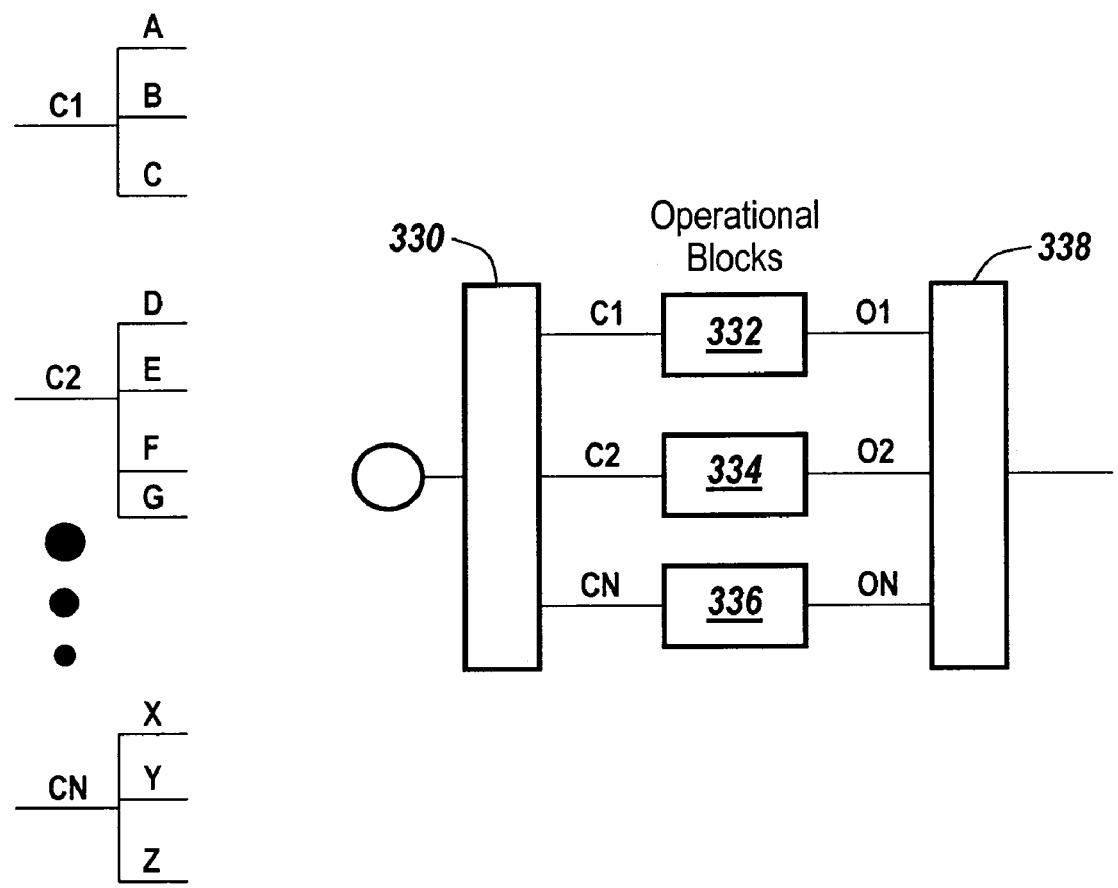
FIG. 3B illustrates an exemplary graphical representation for operating on signals of a desired level of detail.

FIG. 3B illustrates another exemplary embodiment that can be used to operate on composite signals using determined levels of detail. For example, components may have composite signals C1, C2 and CN associated therewith, where the composite signals have individual signals associated therewith, e.g., A, B, C, and D, E, F, G and X, Y, Z, respectively. Signals used with the exemplary embodiment of FIG. 3B may be the same, e.g., C1, C2, and CN may each be made up of three signals A, B and C) or may be different as shown in FIG. 3B. In addition, the signals may have the same structure (e.g., hierarchy) or may have different structures with respect to each other.

An exemplary embodiment may interact with the composite signals using operational blocks 332, 334 and 336 where the operational blocks are configured to perform one or more operations on incoming signals (composite or individual).

Exemplary embodiments of operational blocks 332, 334 and 336 may allow determined levels of detail to be used to operate on incoming signals, e.g., signals making up a composite signal. Exemplary embodiments of operational blocks may operate on substantially any type of signal as long as the operational block is configured to work on that signal type.

For example, block 332, 334 and 336 may be duplicated and may be configured to operate on signals C1, C2 and CN, where signals C1, C2 and CN can differ from each other. In another embodiment, operational blocks 332, 334 and 336 may be different with respect to each other. For example, block 332 may be configured to operate on a composite signal that includes three signals, and block 334 may be configured to work on a composite signal that includes 4 signals. Other embodiments may be configured in still other ways.

Exemplary embodiments may further include operational blocks that can interact with composite signals at varying levels of detail. For example, block 332 may operate on composite signal C1 with a first level of detail that is higher than a second level of detail that is used to operate on composite signal C2 using block 334. An exemplary embodiment may further allow other operations to be performed on some or all of the composite signals using another graphical representation, such as another operational block. For example, the other operational block may apply gains to individual signals, composite signals, etc., according to user defined or system defined criteria, when the signals have passed through blocks 332, 334 or 336.

FIG. 3B further illustrates a collapse marker 338 that groups the non-composite signals O1, O2 and ON into a single composite signal. The collapse marker 338 and the expansion marker 330 are polymorphic operational blocks.

Figure 4:
FIG. 4 illustrates a technique for using an expansion marker in a textual environment.
Figure 4:
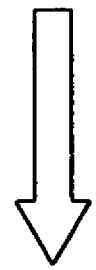

FIG. 4 illustrates an expansion marker that may be used in a textual environment (such as a textual programming environment or a textual modeling environment) according to one embodiment of the invention. In FIG. 4, y represents a composite signal that can include composite data. In FIG. 4, y may include two non-composite data elements (y.a and y.b). FIG. 4 further includes a second composite signal that can include composite data represented as u, where u includes two non-composite data elements (u.a and u.b). FIG. 4 may further include a "@" symbol that can represent an expansion marker. For example, @ may be used in an expression y=fcu(@u) in an exemplary textual environment when the function fcn takes a single non-composite data input and gives a single output. In the embodiment of FIG. 3, composite data u, instead of a non-composite data may be provided as an input in the expression y=fcu(@u).

The expansion marker @ indicates that function fcn should be invoked for the individual non-composite data elements in the composite data u. Due to the use of expansion marker @, an interpreter of the textual environment/programming language environment understands that the composite data u is expanded first before the function fcn is called on the individual elements in the composite data u. After the interpreter reads the statement "y=fcn(@u)", function fcn is invoked as the following:

$y.a=fcn(u.a)$ $y.b=fcn(u.b)$

The use of the "@" symbol as an expansion marker is for illustrative purposes only. The expansion marker may be any character, symbol or a combination of characters/symbols. Furthermore, the expansion marker does not have to be provided at the beginning of the function statement and may be used before, within and/or after the function statement. The interpreter may employ a corresponding collapse mechanism to regroup the expanded data u so that a single output can be provided. The collapse mechanism may be employed whenever the expansion mechanism is employed, even in the absence of a collapse marker. Alternatively, the collapse mechanism may be employed only when there is a collapse marker. Moreover, the functions may have multiple inputs and/or multiple outputs.

Figure 5A:
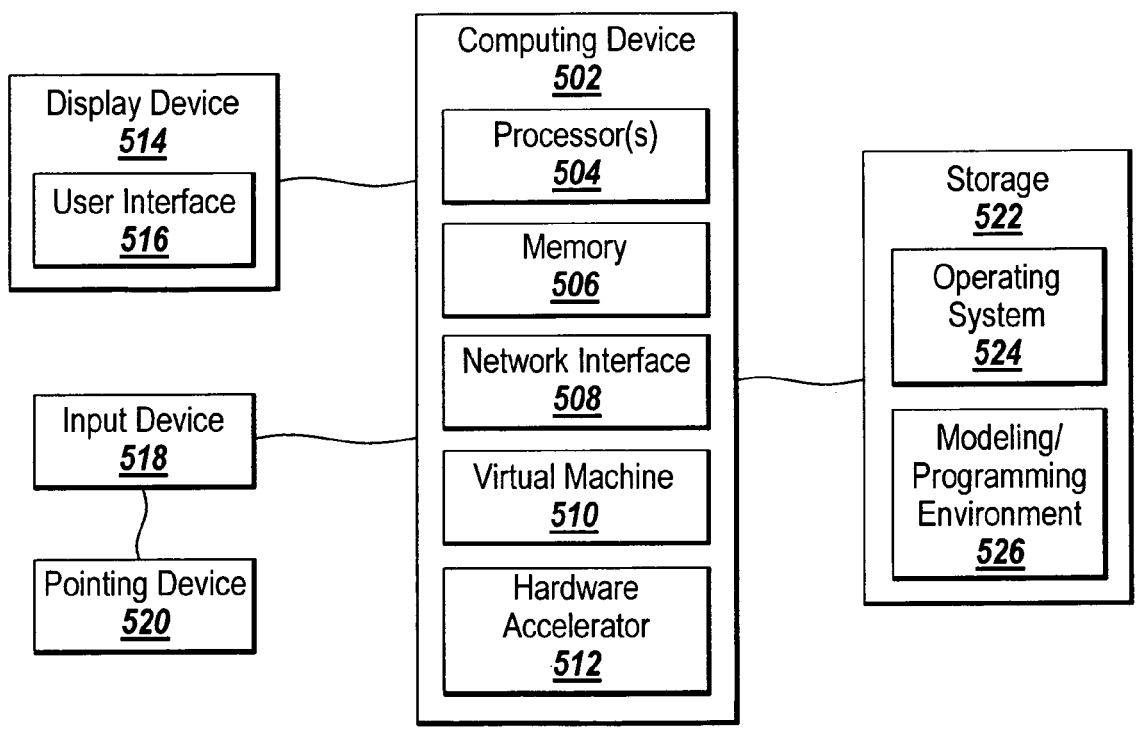
FIG. 5A is a block diagram of a computing device suitable for practicing an exemplary embodiment.

FIG. 5A illustrates an exemplary system 500 that can be used to practice an exemplary embodiment. System 500 may include computing device 502.

In one embodiment, computing device 502 may include processor 504, memory 506, network interface 508, virtual machine 510, and hardware accelerator 512. Processor 504 may execute code stored in the memory 506 and/or elsewhere with respect to computing device 502. Computing device 502 may include substantially any number of processors 504, where processors 504 may be single core devices or multi-core devices. Processors 504 may reside on computing device 502 and/or may be located remotely with respect to computing device 502.

Memory 506 may include a device that stores information. Memory 506 may include a random access memory (RAM) (e.g., a dynamic random access memory (DRAM), static random access memory (SRAM), extended data out random access memory (EDO RAM)), etc.

Network interface 508 may include a device for sending data to a destination or for receiving data from a destination. In one embodiment, network interface 408 may be a transceiver-like mechanism that enables system 500 to communicate with other devices and/or systems. Network interface 508 may communicatively couple computing device 502 to substantially any type of network. Network interface 508 may include a built-in network adapter, network interface card (NIC), Personal Computer Memory Card International Association (PCMCIA) network card, card bus network adapter, wireless network adapter, Universal Serial Bus (USB) network adapter, modem or any other device suitable for interfacing the computing device 502 to any type of network.

Virtual machine 510 may include logic that allows resources in system 500 to be shared dynamically. In one embodiment, virtual machine 510 may instantiate multiple instances of a device or machine in memory 506 using one or more processors 504. Virtual machine 510 may use multiple threads when creating multiple instances of code on computing device 502. Hardware accelerator 512 may include logic that accelerated processing capabilities of computing device 502. Hardware accelerator 512 may include devices, such as field programmable gate arrays (FPGAs), application specific integrated circuits (ASICs), etc.

The system 500 may also include display device 514, input device 518, pointing device 520, and storage device 522. Computing device 502 may include a device that executes instructions to perform an operation and may include devices, such as a desktop computer, a laptop computer, a client, a server, a mainframe, a personal digital assistant (PDA), a web-enabled cellular telephone, a smart phone, smart sensor/actuator, or another computation, communication or entertainment device such as MP3 players, media management devices, recording and playback devices, TiVo®, Apple®) TV, digital cameras, and other media management devices.

Display device 514 may include a device that displays information to a user and may include a cathode ray tube (CRT), flat panel, liquid crystal display (LCD), plasma, etc., based display. User interface 516 may include logic to display information to a user. In one embodiment, user interface 516 may be a graphical user interface (GUI) that displays model information to a user.

Input device 518 may include logic to receive user inputs. Embodiments of input device 518 may include keyboards, touch sensitive displays, biometric sensing devices, etc.

Pointing device 520 may include a device operated by a user to manipulate information in user interface 516. In one embodiment, pointing device 520 may include a mouse, trackball, pen-based pointing device, biometric input device, etc.

Storage 522 may include logic that stores information on behalf of system 500. Embodiments of storage 522 may include magnetic, optical, or other types of storage devices. In one embodiment, storage 522 may include operating system 524 and modeling environment 526. Operating system 524 may include code that manages hardware and/or software resources of a system, such as system 500. For example, operating system 524 may manage modeling/programming environment 526, where modeling/programming environment 526 allows a user to model and/or simulate physical systems, such as time based systems, event based systems, state based systems, data flow based systems, etc. The modeling/programming environment 526 may be, for example, a graphical modeling environment, a graphical programming environment, a textual modeling environment, a textual programming environment or any combination thereof. Embodiments of operating system 524 may include, but are not limited to, Microsoft® Windows® operating systems, Unix operating system, Linux operating systems, MacOS® operating system, etc. Operating system 524 may further include a real-time operating system, an open source operating system, a proprietary operating system, an operating system for mobile computing devices, and/or another type of operating system capable of running on computing device 502 and/or performing operations described herein.

Figure 5B:
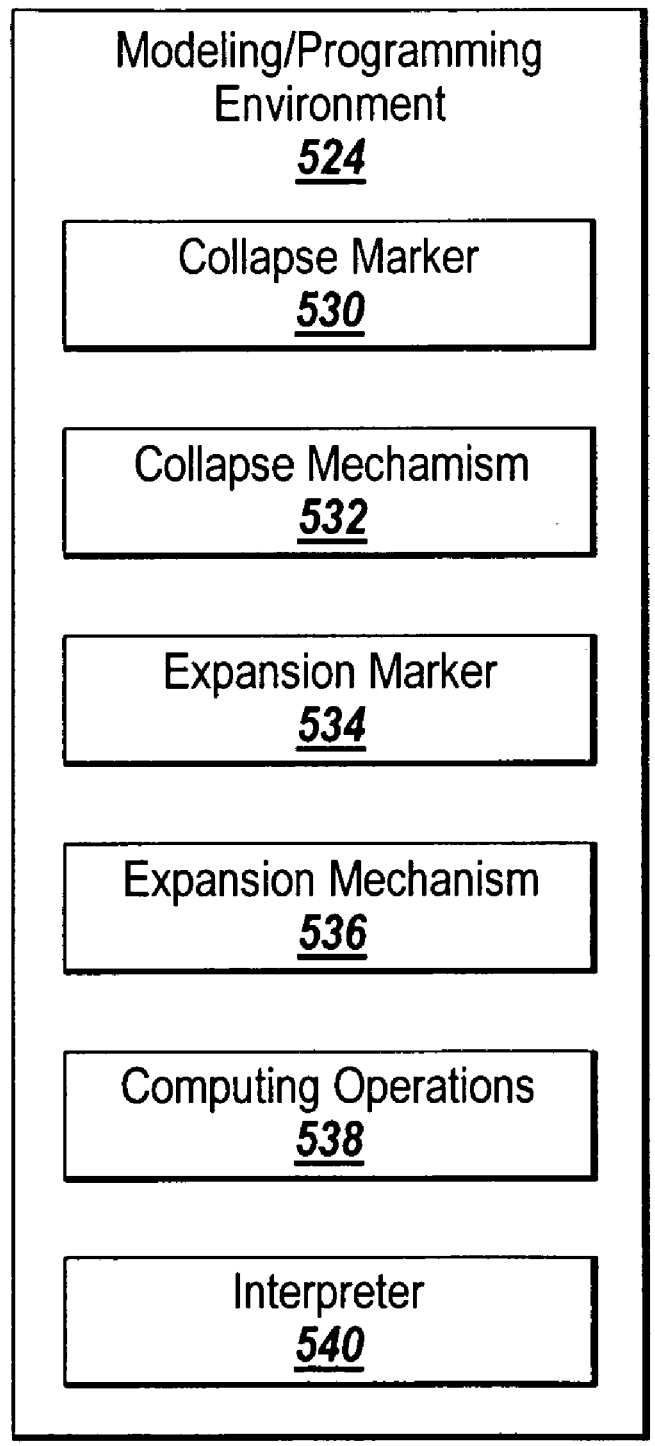
FIG. 5B illustrates details of a modeling environment for an exemplary embodiment.

FIG. 5B illustrates modeling/programming environment 526 in greater detail. Modeling/programming environment 526 may include a collapse marker 530, a collapse mechanism 532, an expansion marker 534, an expansion mechanism 536, one or more computing operations 538, and an interpreter 540. Other embodiments of modeling/programming environment 526 can include more components or fewer components without departing from the spirit of the invention.

Collapse marker 530 may include code to indicate that multiple data elements are to be combined into composite data. Collapse mechanism 532 may include code that groups the multiple data elements designated by collapse marker 532 into the composite data. Expansion marker 534 may include code that identifies composite data that should be expanded (e.g., expanded into a number of data elements). Expansion marker 534 may further identify that the expanded data elements may be processed separately (e.g., processed individually). Expansion mechanism 536 may include code that expands composite data into a number of data elements. Expansion mechanism 536 may operate with computing operations 538 to process expanded data elements.

Computing operation 538 may include machine executable instructions embodied in code (e.g., software) that perform one or more operations on behalf of computing device 502 when executed thereon.

Interpreter 540 may include code that interprets a model in the modeling/programming environment 524. In one embodiment, interpreter 540 may be part of a compiler. For example, interpreter 540 may employ expansion mechanism 536 when expansion marker 534 is encountered in a model to expand the corresponding composite data before individual elements in the composite data are processed by the computing operation 530. In another embodiment, when interpreter 540 encounters collapse marker 530, collapse mechanism 524 may group multiple data elements into composite data. In still another embodiment, when interpreter 540 encounters expansion marker 534, both expansion mechanism 536 and the collapse mechanism 532 may be employed even in the absence of a collapse marker 530.

Expansion marker 534 and collapse marker 530 can take various forms. For example, in a graphical environment, expansion marker 534 and/or collapse marker 530 may be a graphical component. However, in a textual environment, expansion marker 534 and/or collapse marker 530 may be represented by a specific symbol (e.g., letter, number, special character, etc.). Alternatively, expansion marker 534 and/or collapse marker 530 can be a property or attribute of a composite variable or composite data. One of ordinary skill in the art will appreciate that the exemplary embodiments of expansion marker 534 and collapse marker 530 are merely examples and not to be used to limit the present invention and other implementations are possible without departing form the spirit of the invention. When a model utilizes the functionality of expansion marker 534 and/or collapse marker 530 provided by modeling environment 524, an instance of expansion marker 534 and/or an instance of collapse marker 530 are created and stored in the model.

Figure 6:
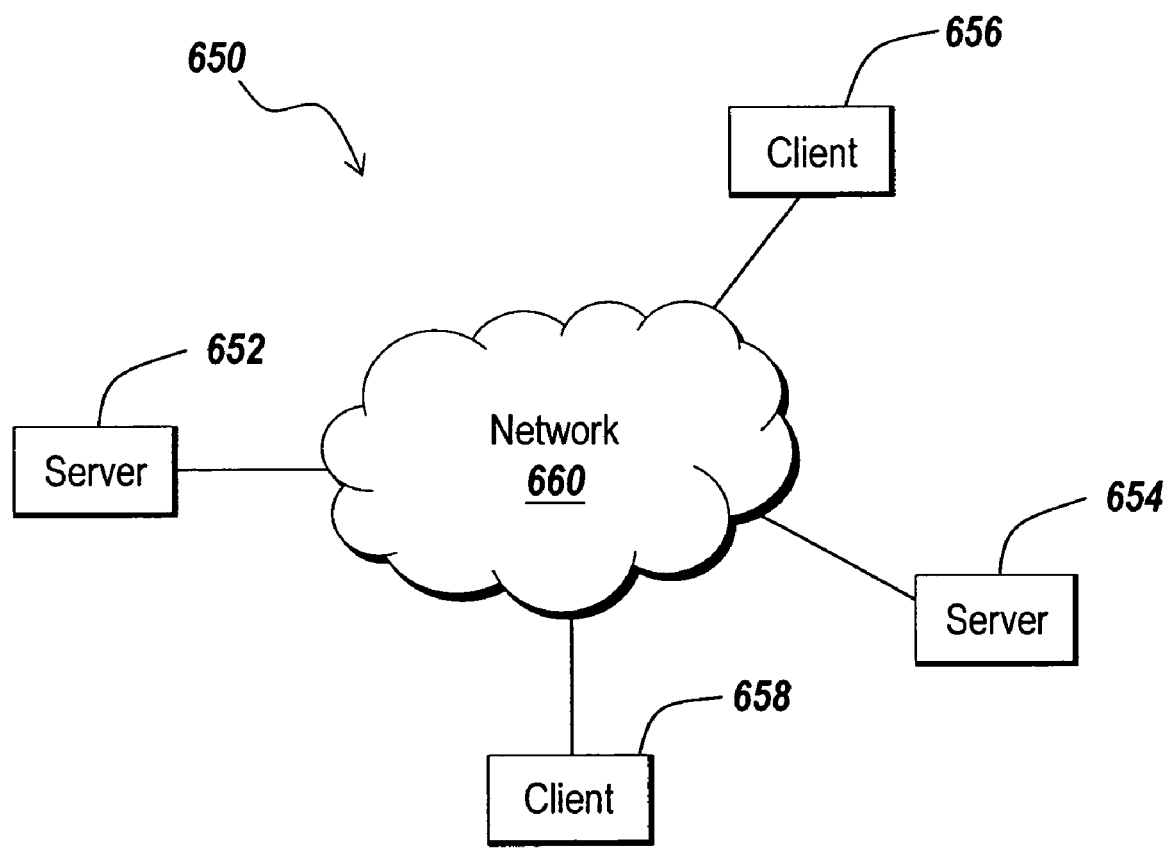
FIG. 6 depicts an exemplary distributed system suitable for practicing an exemplary implementation.

FIG. 6 is an exemplary network environment 600 suitable for a distributed implementation of an exemplary embodiment. Environment 600 may include one or more servers 652, 654 coupled to clients 656, 658 via a communication network 660. In one implementation, servers 652, 654 and/or clients 656, 658 can be implemented by a device, such as computing device 502. Servers 652, 654 and/or clients 656, 658 may exchange information through network interfaces when interacting with communication network 660. Communication network 660 may include substantially any type of network, such as but not limited to, the Internet, an intranet, a LAN (Local Area Network), a WAN (Wide Area Network), a MAN (Metropolitan Area Network), a wireless network (e.g., using IEEE 802.11 or Bluetooth), etc. Communication network 560 may use middleware, such as CORBA (Common Object Request Broker Architecture) or DCOM (Distributed Component Object Model) to allow a computing device (e.g., client 556) on the communication network 560 to communicate directly with another computing device (e.g., client 558).

Figure 7A:
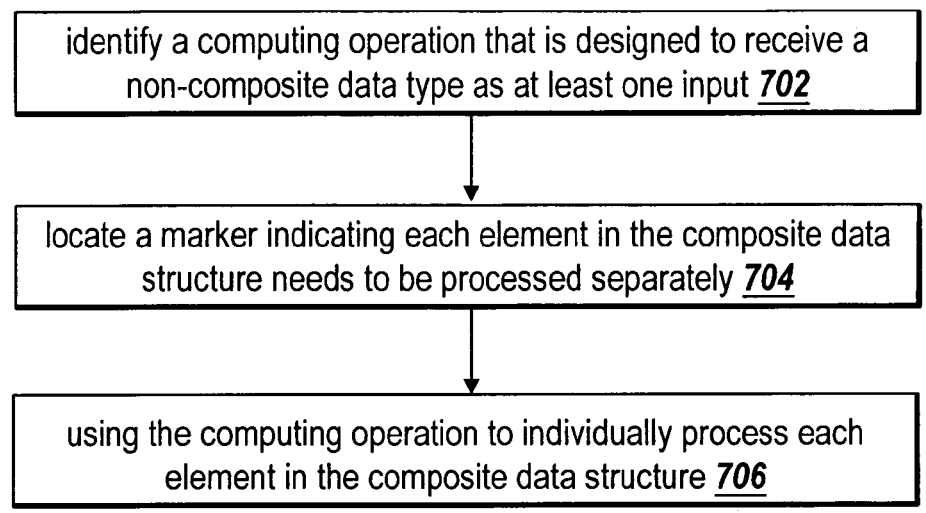
FIG. 7A is a flowchart depicting exemplary processing for composite data received by a process that is designed to accept non-composite data.

FIG. 7A is a flowchart depicting exemplary processing for operating on individual data elements in composite data. Initially, a computing operation may be identified, where the computing operation is adapted to receive non-composite data (702). For example, the computing operation may be associated with an input port of a block in the model and may be configured to operate on individual data elements. In one embodiment, the computing operation can include one or more of a function, a graphical component, an action (in an executable state diagram), or a combination thereof.

A marker, such as the expansion markers discussed above, may be generated where the marker identifies that elements in the composite data should be processed separately with respect to other elements in the composite data by the computing operation 704. The computing operation may interact with the marker and may process the data elements individually based on information associated with the marker 706. In one embodiment, multiple copies of computing operation may be used to process the data elements (e.g., a first instance of computing operation may process a first data element, and a second instance, or copy, of computing operation may process a second data element). Computing operation(s) may be duplicated to process the different elements in the composite data. Alternatively, the same computing operation may be invoked multiple times to process the different elements in the composite data. Furthermore, some elements in the composite data may be processed with one computing operation and other data elements may be processed with another computing operation, where the other computing operation differs from the first computing operation.

Figure 7B:
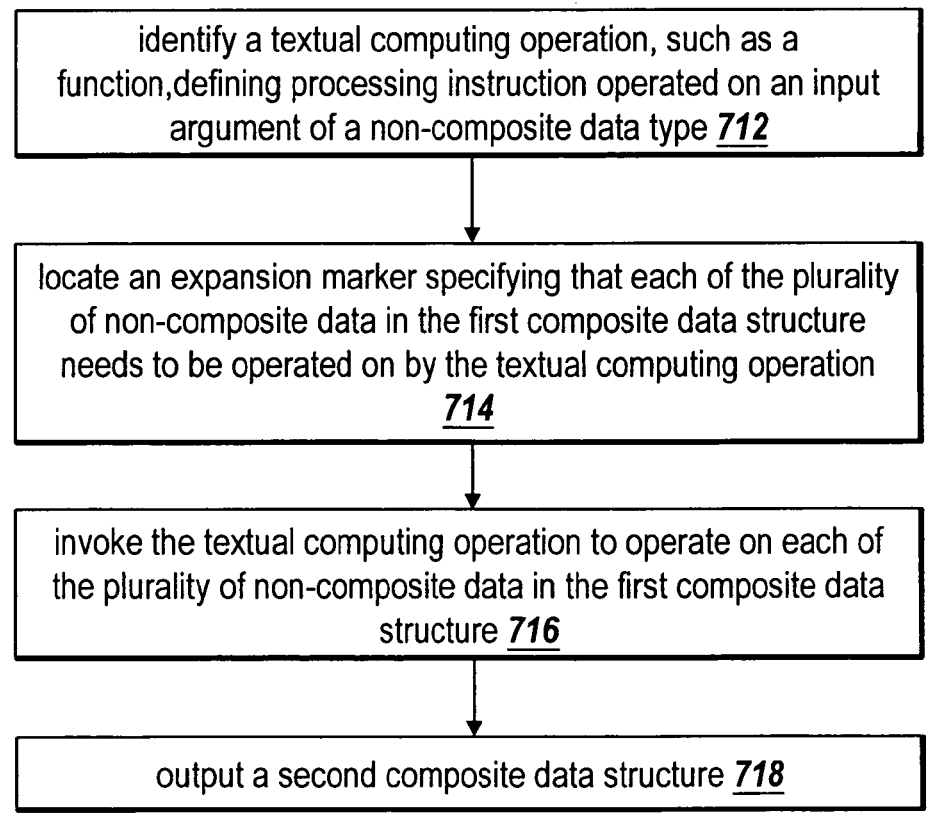
FIG. 7B is a flowchart depicting exemplary processing for composite data received by a function that is designed to receive only a non-composite data type.

FIG. 7B is a flowchart depicting exemplary processing that can be used to operate on composite data in a textual environment. The textual environment may be a textual modeling environment, textual programming environment or a combination thereof. Examples of textual computing operations that can be used with the embodiment of FIG. 7B include, but are not limited to, functions. A textual computing operation may be provided in a textual program or model, where the textual computing operation identifies processing to be performed on a portion of a composite data type, such as a first input argument of the non-composite data type (712). The first composite data may be provided to the textual computing operation as the first input argument, where the first composite data may include multiple non-composite data elements. An expansion marker may be located in the textual program, where the expansion marker specifies that each of the non-composite data elements in the first composite data should be separately operated on using the textual computing operation (714).

The textual computing operation is invoked to operate on each of the non-composite data elements in the first composite data (716). The textual computing operation may output a second composite data that includes results processing performed on each of the non-composite data elements in the first composite data (718). The first and second composite data may or may not have the same hierarchy or data structure.

In one embodiment, a textual computing operation, such as a function, may have at least two input arguments, where one input argument (the first input argument) is of a non-composite data type and the other input argument is of composite data type. In this case, when composite data is provided to the first input argument, the interpreter may detect that an expansion marker is used. The interpreter may expand the composite data before the function is actually invoked. Exemplary embodiments may allow existing functions with non-composite data type requirement to operate with composite data without requiring that the existing functions be modified.

In another exemplary embodiment, an expansion marker may be represented as an attribute of composite data that is provided as an input. For example, a function func (assuming it takes composite data as first input u1 and a non-composite data as second input u2) may be provided with composite data x1 as a first input and composite data x2 as a second input, where x2 has an attribute indicating that each element in x2 should be separately processed by the function. For example, in this case, a user may type the following statement:

$y=\text{func}(x1, x2)$

In this case, expansion may only be performed on x2, and not on x1. In this example, the function invocation may look the same as if the function were invoked with a non-composite data.

Exemplary embodiments may provide a less complex way of processing composite data as compared to conventional techniques. As in the case of a textual function shown above, the use an expansion marker may be less complex for a user than having to write/modify code such that each non-composite data is first extracted from the composite data for processing by the same computing operation and then regroups the individual data elements back into composite data. Although a special function can be written by a developer to deal with composite data, the developer may need to create every function in pairs for a particular application, so that one function can be used to handle non-composite data and the other function can be used to handle composite data. Since the special function may require that the developer generate two functions for each instance where a function is needed, the use of a special function may not be desirable. In contrast, use of an expansion marker in a modeling environment allows existing functions or computing operations that were designed to handle non-composite data to be used to handle composite data without any modification to the existing functions or computing operations.

Figure 7C:
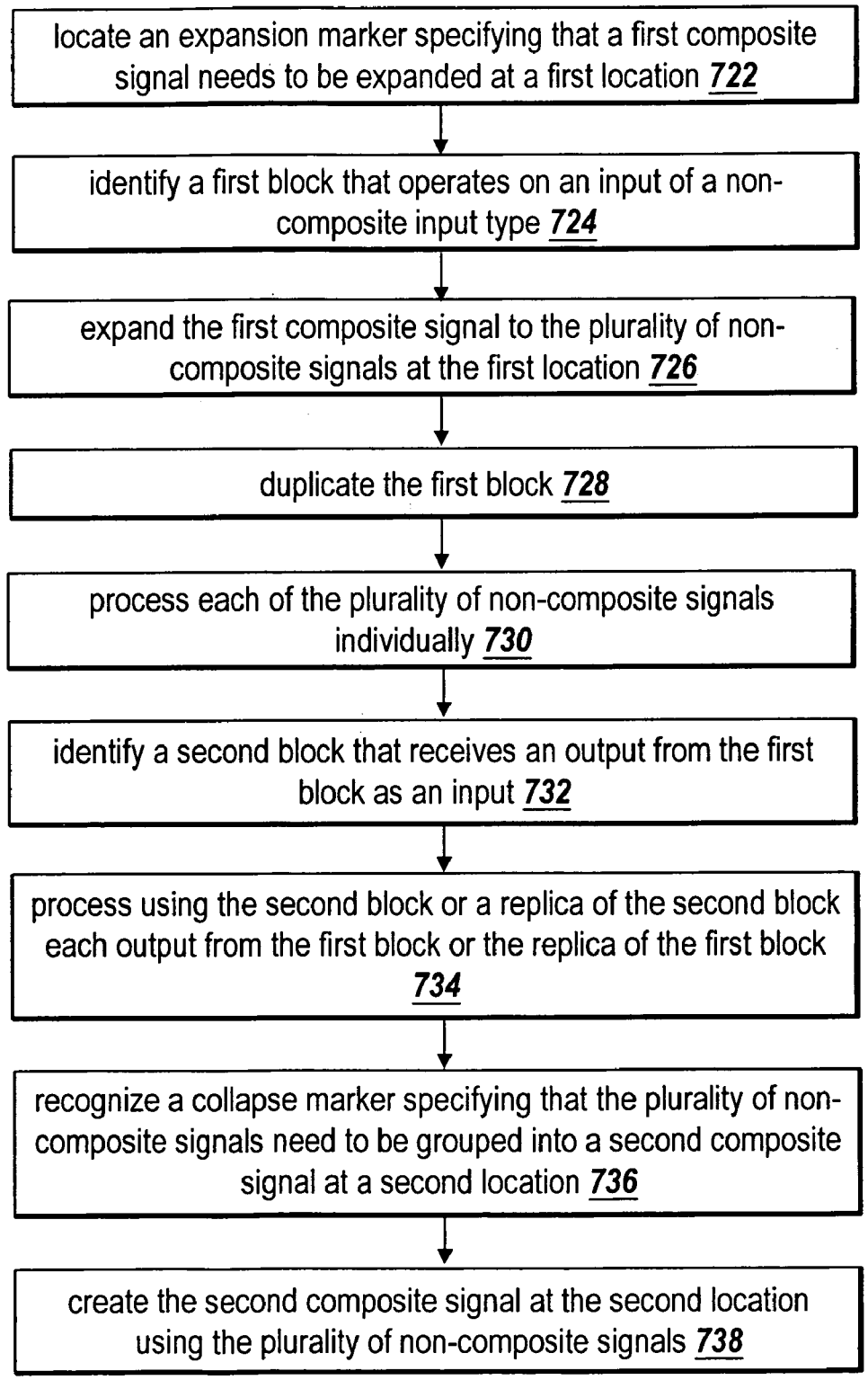
FIG. 7C is a flowchart depicting exemplary processing for a composite signal in a graphical modeling environment.

FIG. 7C is a flowchart depicting exemplary processing that can be used on a composite signal in a graphical modeling environment when the computing operation is realized through one or more graphical modeling components. An expansion marker may be specified (722). For example, in one embodiment, the expansion marker may be located by specifying that a first composite signal should be expanded at a first location. The first location may be at a specific propagation path of the first composite signal. Alternatively, the first location also may be anywhere within a region that is between two graphical modeling elements. The first composite signal is composite data that includes more than one (non-composite) signal, such as a SIMULINK bus signal. A bus signal is a group of signals represented by a single line in a block diagram. The signals in the bus signal are in order from the top input port of a bus creator block to the bottom input port of a bus creator block. In an exemplary embodiment, the expansion marker may be provided by modeling/programming environment as a graphical modeling component and/or a property/attribute of a graphical modeling component. Alternatively, the expansion marker may also be provided as a component of another graphical modeling component, such as a subsystem.

A first block may be identified in the model, where the first block operates on a first input of a non-composite data type. In one embodiment, the first block may be a subsystem that includes additional graphical modeling components. The first block is not limited to receive a single non-composite signal as input, but may also take additional non-composite signal or a composite signal as additional input. The first input of the first block, however, is specified to be of a non-composite data type. The first composite signal is expanded to multiple non-composite signals at the first location (726). Each of the plurality of non-composite signals is processed individually by the first block (730). Before 730, the first block may be optionally duplicated (728) to handle different non-composite signals in the first composite signal. In one embodiment, the processing of some non-composite signals may be concurrent. In another embodiment, the processing of some non-composite signals may be performed in parallel. Both in concurrent processing and parallel processing, the non-composite signals may be processed by different pieces of processing logic at the same time.

Optionally, a second block may be employed in a model, where the second block receives an output from the first block as an input (assuming the second block like the first block is not designed to process a composite signal). In this case, the second block is identified in step 732. Each output from the first block or a duplicate of the first block is processed by the second block or a replica of the second block in step 734. Like the first block, the second block may be duplicated to process different non-composite input signals. The second block may be duplicated together with the first block (assuming the first block is duplicated) or the second block may be duplicated separately from the first block.

Embodiments may use single processors, or processing devices, or multiple processor/processing devices to process outputs from the first block. For example, an embodiment may process two outputs from a first block using two duplicate second blocks. In this embodiment, processing associated with one of the second blocks may be performed on a first processing device, and processing associated with the other second block may be performed on another processing device. The two processing devices may operate in serial (i.e., processing for the first one of the second blocks completes before the other second block is processed) or in parallel (where both second blocks perform processing at the same time). In this embodiment, the two processing devices may be local with respect to each other or remote with respect to each other (e.g., connected via a network).

In step 736, a collapse marker optionally is obtained to specify that the multiple non-composite signals that have been processed by the first block or that both the first block and the second block need to be grouped into a second composite signal at a second location. The first composite signal and the second composite signal may in some instances have the same hierarchy or data structure. Like the expansion marker, the collapse marker can be provided by modeling/programming environment as a graphical modeling component or a property or attribute of a graphical modeling component. The collapse marker can instead be provided as part of a graphical modeling component, such as a subsystem. In one embodiment of the present invention, both the expansion marker and the collapse marker are provided by the same subsystem. Once the collapse marker is obtained, the second composite signal is created at the second location using the multiple non-composite signals that have been processed in step 738. The second location may be a location that the first composite signal "appears" to propagate through if not for the collapse marker at the second location. Alternatively, the second location may be anywhere within a region that is between two graphical modeling components.

Exemplary implementations may allow for processing of composite data with an expansion mechanism at a location designated by an expansion marker.

Exemplary embodiments may be implemented in one or more technical computing environments (TCEs). A TCE may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In one implementation, a TCE may include a dynamically typed language that can be used to express problems and/or solutions in mathematical notations familiar to those of skill in the relevant arts. For example, the TCE may use an array as a basic element, where the array may not require dimensioning. In addition, the TCE may be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

The TCE may further provide mathematical functions and/or graphical tools (e.g., for creating plots, surfaces, images, volumetric representations, etc.). In one implementation, the TCE may provide these functions and/or tools using toolboxes (e.g., toolboxes for signal processing, image processing, data plotting, parallel processing, optimization, etc.). In another implementation, the TCE may provide these functions as block sets (e.g., an optimization block set). In still another implementation, the TCE may provide these functions in another way, such as via a library, etc. The TCE may be implemented as a text based environment, a graphically based environment, or another type of environment, such as a hybrid environment that is both text and graphically based.

An alternative embodiment may implement the TCE using one or more text-based products. For example, a text-based TCE, may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

Another alternative embodiment may implement the TCE in a graphically-based TCE using products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue or Advanced Design System (ADS) by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; Signal Processing Workbench (SPW) from CoWare Inc.; or aspects of a Unified Modeling Language (UML) or SysML environment.

Still another alternative embodiment may be implemented in a language that is compatible with a product that includes a TCE, such as one or more of the above identified text-based or graphically-based TCE's. For example, MATLAB (a text-based TCE) may use a first command to represent an array of data and a second command to transpose the array. Another product, that may or may not include a TCE, may be MATLAB-compatible and may be able to use the array command, the array transpose command, or other MATLAB commands. For example, the other product may use the MATLAB commands to perform optimizations on one or more units of execution.

Yet another alternative embodiment may be implemented in a hybrid TCE that combines features of a text-based and graphically-based TCE. In one implementation, one TCE may operate on top of the other TCE. For example, a text-based TCE (e.g., MATLAB) may operate as a foundation and a graphically-based TCE (e.g., Simulink) may operate on top of MATLAB and may take advantage of text-based features (e.g., commands) to provide a user with a graphical user interface and graphical outputs (e.g., graphical displays for data, dashboards, etc.).

Still another alternative embodiment may represent composite data using a SIMULINK bus signal, a MATLAB structure, a MATLAB cell array, a C structure.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 6A to C, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1-2 depending on specific deployments and/or applications. Further, disclosed implementations may not be limited to any specific combination of hardware and/or software.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

The scope of the invention is defined by the claims and their equivalents.

We claim:

1. A non-transitory computer storage medium storing executable instructions that when executed cause a processing device to process a composite signal in a graphical representation, the medium comprising:
    instructions for identifying a first graphical component, the first graphical component processing at least one input of a non-composite data type in the graphical representation, the at least one input is comprised of a first composite signal including a plurality of non-composite signals;
    instructions for expanding the first composite signal into the plurality of non-composite signals at a first location;
    instructions for concurrently processing at least two of the plurality of non-composite signals individually using the first graphical component; and
    instructions for displaying the graphical representation when the plurality of non-composite signals are processed using the first graphical component.

2. The medium of claim 1, wherein the first location is designated by an expansion marker or a textual marker in the graphical representation.

3. The medium of claim 1, wherein the graphical representation is a time-based block diagram model and the first graphical component is a block in the time-based block diagram model.

4. The medium of claim 1, further comprising:
    instructions for duplicating the first graphical component to create a replica of the first graphical component; and
    wherein the processing further includes:
    individually processing the at least a subset of the plurality of non-composite signals using the first graphical component or the replica of the first graphical component.

5. The medium of claim 2, further comprising:
    instructions for identifying a collapse marker, where the collapse marker specifies that the plurality of non-composite signals is grouped into a second composite signal at a second location, wherein the first graphical component is positioned between the expansion marker and the collapse marker on a propagation path of the first composite signal; and
    instructions for creating the second composite signal at the second location using the plurality of non-composite signals.

6. The medium of claim 1, further comprising:
    instructions for identifying a second graphical component that receives an output from the first graphical component, the second graphical component operating only on a non-composite input signal; and
    instructions for processing outputs of the first graphical component using the second graphical component.

7. The medium of claim 6, further comprising:
    instructions for identifying a collapse marker, where the collapse marker specifies that the plurality of non-composite signals be grouped into a second composite signal at a second location, wherein the first graphical component and the second graphical component are positioned between the first location and the second location on a propagation path of the first composite signal; and
    instructions for creating the second composite signal at the second location using the plurality of non-composite signals.

8. A computer-implemented method for processing a composite signal in a graphical environment, the method comprising:
    identifying a first graphical component that processes at least one input of a non-composite data type in a graphical representation;
    providing a first composite signal including a plurality of non-composite signals to the first graphical component as the at least one input;
    expanding the first composite signal to the plurality of non-composite signals at a first location;
    concurrently processing at least two of the plurality of non-composite signals individually using the first graphical component; and
    displaying the graphical representation when the plurality of non-composite signals are processed using the first graphical component.

9. The method of claim 8, wherein the processing of at least two of the plurality of non-composite signals is concurrent.

10. The method of claim 8, wherein the processing of at least two of the plurality of non-composite signals is performed in parallel.

11. The method of claim 8, further comprising:
    identifying a collapse marker, where the collapse marker specifies that the plurality of non-composite signals is grouped into a second composite signal at a second location, wherein the first graphical modeling component is positioned between the first location and the second location on a propagation path of the first composite signal; and
    creating the second composite signal at the second location using the plurality of non-composite signals.

12. The method of claim 11, wherein at least one of the expansion marker or the collapse marker is provided by a subsystem.

13. The method of claim 11, wherein the first composite signal has a first hierarchy and the second composite signal has a second hierarchy that differs from the first hierarchy.

14. The method of claim 8, wherein the first composite signal is a bus signal or a subsystem.

15. The method of claim 8, wherein the expansion marker is a property, attribute, or a part of a graphical component.

16. The method of claim 15, wherein the first graphical component comprises a computing operation.

17. The method of claim 16, wherein the computing operation invokes a function having a composite data including a plurality of non-composite data as an input argument.

18. The method of claim 16, wherein the computing operation includes an action in an executable state diagram, the action including a condition or transition action in the executable state diagram, the executable state diagram comprising a state having an entry action, a during action, or an exit action.

19. A computer system for processing composite data, said system comprising:
  a processing logic for processing a computing operation that receives a non-composite data type as at least one input, the composite data provided to the computing operation as the at least one input;
  an expansion marker that indicates that elements in a first composite data need to be processed separately;
  an expansion mechanism that uses the computing operation to concurrently process at least two elements in the first composite data individually; and
  a storage device for storing a result of processing elements of the first composite data individually with the computing operation.

20. The system of claim 19, wherein the computing operation includes a graphical function or a textual function.

21. The system of claim 19, wherein the computing operation includes at least a graphical modeling component or a subsystem in a graphical modeling environment.

22. The system of claim 19, wherein the computing operation includes a condition or transition action in an executable state diagram, the executable state diagram comprising a state having an entry action, a during action, or an exit action.

23. The system of claim 19, further comprising:
  a collapse marker that indicates that a plurality of elements need to be grouped into a second composite data; and
  a collapse mechanism that groups the plurality of elements into the second composite data.

24. The system of claim 19, wherein the first composite data is a bus, a structure or a cell array.

25. The system of claim 19, wherein the processing logic is one of a microprocessor or a field programmable gate array.

* * * * *

UNITED STATES PATENT AND TRADEMARK OFFICE
CERTIFICATE OF CORRECTION

| | | |
|---|---|---|
| PATENT NO. | : 7,949,502 B2 | Page 1 of 1 |
| APPLICATION NO. | : 12/069212 | |
| DATED | : May 24, 2011 | |
| INVENTOR(S) | : Mojdeh Shakeri et al. | |

It is certified that error appears in the above-identified patent and that said Letters Patent is hereby corrected as shown below:

Title Page, Item (54) and at Column 1, lines 1-3, Title of Invention of the printed patent, "Processing Composite Data Signal by Expansion in a Graphical Representation" should be --Processing Composite Data By Expansion--.

At column 6, line 58 of the printed patent, please change "ofFIG.3B" to --of Fig.3B--.

Signed and Sealed this
Sixteenth Day of August, 2011

David J. Kappos
*Director of the United States Patent and Trademark Office*